J. F. Griffen,
Turpentine Still.
No. 93,988. Patented Aug. 24, 1869.
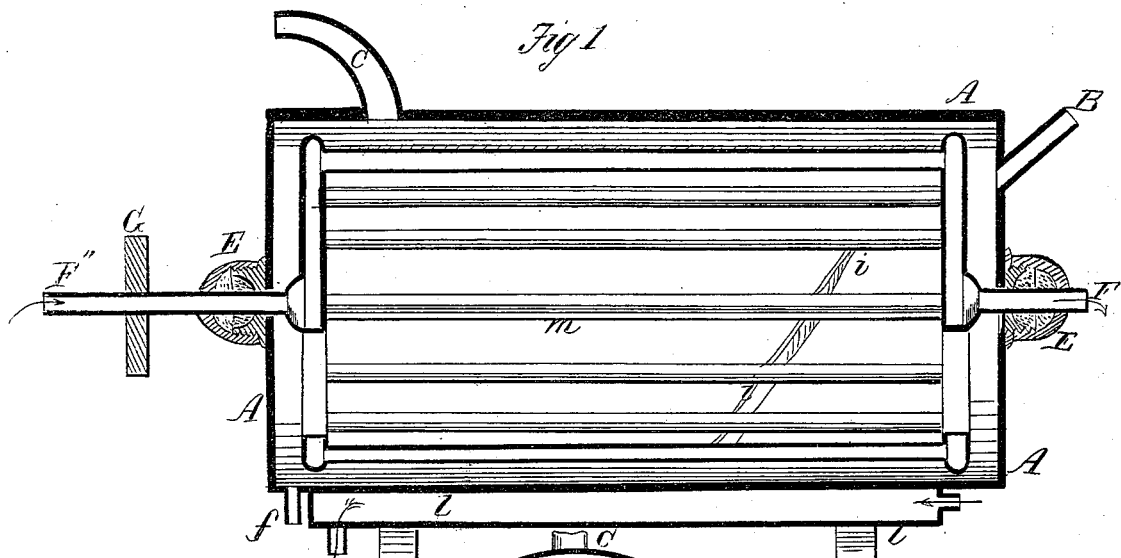
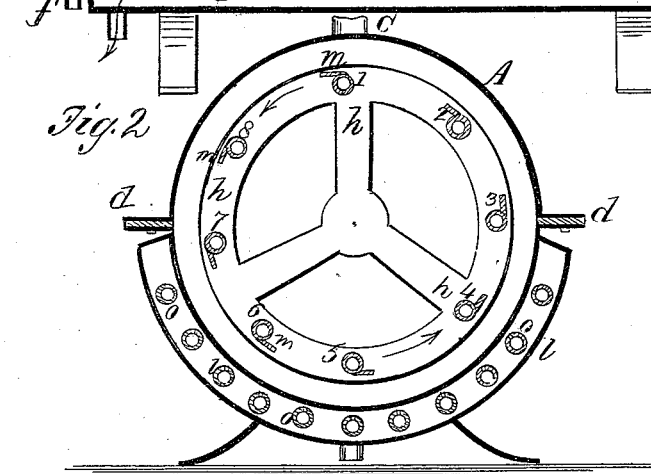 
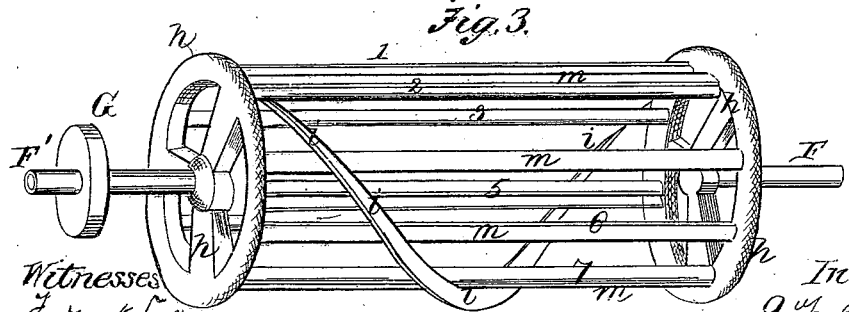
Witnesses  
Frederick Sayer  
Chase & Scott
Inventor  
J. F. Griffen  
By atty  
J. Mc Pirtie

United States Patent Office.

JOHN F. GRIFFEN, OF NEW YORK, N. Y.

Letters Patent No. 93,988, dated August 24, 1869.

IMPROVEMENT IN THE MANUFACTURE OF ROSIN AND SPIRITS OF TURPENTINE.

The Schedule referred to in these Letters Patent and making part of the same.

*To all whom it may concern:*

Be it known that I, JOHN F. GRIFFEN, of New York city, of New York county, in the State of New York, have invented certain new and useful "Improvements in Manufacturing Rosin and Turpentine;" and I do hereby declare that the following is a full and exact description thereof, reference being had to the accompanying drawings, making part of this application.

In the old-fashioned and commonly-used process and apparatus for the distillation of turpentine, the crude turpentine is put into a retort and highly heated, and the vapors pass off through a gooseneck.

This process and apparatus involve, in practical operation, many and serious objections, among which may be mentioned the liability to burn the material, so that the rosin produced during the process is apt to be discolored, and consequently depreciated in marketable value.

Many plans have been suggested and patented, with the view to improve upon the old-fashioned process and apparatus, and overcome its objections, and Letters Patent were granted to myself and J. E. Winants, September 15, 1868, for a new process and apparatus, in the operation of which the crude turpentine is distilled by a continuous process.

This plan and apparatus embrace many and great advantages over the old system, but they are subject to some objections in practice.

From careful experiment and practical experience, I have found that in such continuous process (passing the crude material along through an agitator in the still, and discharging it continuously,) it is difficult to regulate the speed of the current of material through the still, and the heat comparatively, so that the material shall neither be heated so as to burn, nor allowed to pass through without being heated to such an extent as to effect the distillation of all the contained turpentine which might be obtained.

My present invention has for its object to provide a process and apparatus, by means of which crude turpentine may be distilled with the greatest facility and expedition, while, at the same time, the greatest amount of spirits of turpentine will be obtained from a given amount of crude material, and the rosin shall be whiter and more valuable than that obtained in the course of manufacture heretofore; and to these ends, My invention consists in the hereinafter-described process of submitting the crude turpentine to the action of heat from surfaces heated by steam, while confined and agitated within a still.

And my invention further consists in the hereinafter-described improvements in the distilling-apparatus for carrying on the said process.

To enable those skilled in the art to make and use my invention, I will proceed to describe my improved process, and apparatus for conducting the same, referring by letters to the accompanying drawings, in which—

Figure 1 is a vertical longitudinal section of a distilling-apparatus, such as I propose to use;

Figure 2 is a cross-vertical section of the same;

Figure 3 is a detached perspective view of the agitator; and

Figure 4 is a detail view, showing part of a perforated superheated-steam pipe.

In the several figures the same parts are designated by the same letters of reference.

A is the body of the still, which I propose to make about cylindrical in shape, in two parts, provided with suitable flanges and bolted together at *d*, where a suitable packing (I prefer pasteboard saturated with albumen) is inserted, as clearly shown, to render the joint perfectly vapor-tight.

This still is provided with suitable stuffing-box bearings, at E E', through which pass hollow shafts F F', for purposes to be explained, and it is provided with a feed-pipe, B, through which the crude material is introduced, an exit-pipe, *f*, through which the residuum is drawn off, and a gooseneck, C, through which the vapors pass off to the usual condensing-apparatus.

Within this still A is arranged a rotary agitator, which is mounted to turn on its shafts F F', and is formed of two hollow heads *h h*, connected by hollow arms 1, 2, 3, &c.

This agitator is supplied constantly with superheated steam, and is kept in motion by motive-power applied to its driving-pulley G.

It is provided with a helically-arranged band or strip, *i*, around its exterior, the object and effect of which are to feed the contents of the still along toward one end all the time, and thus induce to a thorough agitation thereof, and has also supplied to it a metallic strip, *m*, at each one of the hollow arms 1, 2, 3, &c. The object and effect of these strips *m* are to lift the material contained in the still, and agitate and shower it during the rotation of the said agitator, thus presenting a larger surface for evaporation.

The lower half of the still A is heated by superheated steam, and is formed or supplied with a case, *l*, having an induction-pipe, *s*, and eduction-tube *t*.

The superheated steam may be introduced into the case simply, and the heat radiated from the internal surface of the lower portion or half of case A.

But since the tendency in practice is for the steam to imperfectly heat those parts which are at all remote from or out of a direct path of motion from the induction to the eduction-tubes of the case, I deem it best to provide the case *l* with a series of tubes, *o*, into which the superheated steam is passed, and from which it escapes through numerous perforations in said pipes, arranged so that the jets of steam strike against the surface of the still A.

By this arrangement, fresh superheated steam is constantly being brought into contact in jets with all parts of the surface to be heated, and the radiating-surface can be more evenly heated and kept up to a higher temperature than in any other manner, (by steam.)

The form and arrangement of these perforated tubes *o* are clearly seen at figs. 2 and 4, and this idea of ejecting superheated steam directly on to that part of the surface most necessary to be highly heated, is shown in the Letters Patent granted September 15, 1868, and hereinbefore referred to.

In lieu of the case *l*, supplied with the perforated tubes *o*, closed tubes may be arranged on the interior of the still A, provided with ejecting-pipes similar to *o*, but perforated all around, and the contents of the still be allowed to come directly in contact with such heated tubes; but I deem the construction just before described the best.

The operation of or process carried on by this apparatus may be thus briefly explained:

The still having been supplied, through the tube or feed-pipe B, with a suitable charge, (generally about half the capacity or less of the case A) of the crude material, in a melted or semi-liquid condition, and the supply and discharge-openings being closed, and the steam let on to both the agitator and the still, motion is imparted, through the medium of pulley G, to the hollow shafts of the agitator, which is rotated in the direction indicated by the arrow, fig. 2.

The lower portion of the still is constantly radiating into the contents a high degree of heat, on account of the action of the superheated steam supplied to the case *l*, and its perforated tubes, while at the same time the highly-heated agitator is constantly screwing or feeding the mass of material along, and lifting it up and spraying or showering it over, by means of its worm *i* and lifting-plates or buckets *m*.

By this thorough and constant agitation, whereby all the particles of the mass are constantly brought into contact with fresh heating-surfaces, and the constant supply of superheated steam, the vapors are very rapidly distilled out of the crude material, and pass off through the gooseneck C, while, at the same time, all liability of burning, and thus discoloring the residuum, is avoided.

It is generally necessary to submit the charge (the case A about half full) to the action of the heat and agitator about forty to sixty minutes, in order to distil all the spirits of turpentine out of it, when the residuum may be drawn off, and the rosin will be found to be exceedingly pure, or colorless, and consequently worth a high price in the market.

The operation on successive charges may be rapidly repeated, and as no time and little heat are wasted in any cooling of the still, the manufacture, it will be seen, can be very economically and expeditiously carried on by my process and apparatus.

The still and agitator should be kept heated up to about 450°, and if the crude material be supplied in a properly-melted and strained condition, there will be seldom any necessity for allowing the still to cool for cleaning. When, however, this has to be done, by merely taking out the bolts at the flanges *d*, the plain internal surface of the still is easily cleaned.

The usual supply of water to the still, to assist the escape of the products of evaporation, is used. Of course, many modifications of the details of construction may be adopted by the manufacturer and builder, without departing from the spirit of my invention, and the proper size and proportions of the apparatus and its parts will be obvious to those skilled in the art.

I have found, by experience, that all iron, even when galvanized, should be avoided in that part of the apparatus with which the material comes into contact, as it will surely induce to a discoloration of the products. The packing of pasteboard and albumen I have found the only efficient means of rendering the joint, subjected to the action of the hot products, impenetrable.

Having fully explained my process and apparatus, so that those skilled in the art can make and use my invention, and wishing to be understood as not laying claim to any such process as set forth and described in Letters Patent granted, September 15, 1868, to Messrs. Winants and Griffen, or claiming, broadly, the use of steam-heated surfaces in the process of distillation,

What I claim as new, and desire to secure by Letters Patent, is—

As a new process for the manufacture of turpentine and rosin, subjecting a given charge of crude material to the action of heat from steam-heated surfaces, within a still, while constantly agitated within said still, substantially as hereinbefore set forth.

Also, in an apparatus for carrying on the described process, first, the combination of a steam-heated still with a steam-heated agitator, as and for the purposes set forth; secondly, the combination, with the still, of perforated steam-pipes *o*, or their equivalents, substantially as and for the purposes set forth; thirdly, the screw-feeder *i*, in combination with the agitator; fourthly, the use of a series of lifters or buckets, *m*, in combination with the heating-agitator, substantially as and for the purpose set forth.

In testimony whereof, I have hereunto set my hand and seal, this 16th day of July, 1869.

JNO. F. GRIFFEN. [L. S.]

Witnesses:
CHAS. A. SCOTT,
FREDERIC A. SAYER.